United States Patent [19]

Morimoto

[11] Patent Number: 4,756,583

[45] Date of Patent: Jul. 12, 1988

[54] SCANNING OPTICAL SYSTEM FOR USE IN A LASER BEAM PRINTER

[75] Inventor: Akira Morimoto, Tokyo, Japan

[73] Assignee: Asahi Kogaku Kogyo Kabushiki Kaisha, Tokyo, Japan

[21] Appl. No.: 11,566

[22] Filed: Feb. 6, 1987

[30] Foreign Application Priority Data

Feb. 6, 1986 [JP] Japan .................. 61-25096
Jul. 26, 1986 [JP] Japan .................. 61-176269

[51] Int. Cl.$^4$ .................. G02B 9/12; G02B 9/04; G02B 9/34; G02B 26/08
[52] U.S. Cl. .................. 350/6.5; 350/6.8; 350/434; 350/469; 350/474; 350/479
[58] Field of Search .................. 350/6.5, 6.6, 6.7, 6.8, 350/6.9, 6.91, 433, 434, 469, 474, 479

[56] References Cited

U.S. PATENT DOCUMENTS

| 3,750,189 | 7/1973 | Fleischer | 350/6.91 |
| 4,056,307 | 11/1977 | Rayces | 350/433 |
| 4,099,829 | 7/1978 | Straayer | 350/6.6 |
| 4,179,183 | 12/1979 | Tateoka et al. | 350/479 |
| 4,253,735 | 3/1981 | Kawamura | |
| 4,269,478 | 5/1981 | Maeda et al. | 350/6.8 |
| 4,277,128 | 7/1981 | Kawamura | 350/6.8 |
| 4,318,583 | 3/1982 | Goshima et al. | |
| 4,318,594 | 3/1982 | Hanada | |
| 4,400,063 | 8/1983 | Hayashida | 350/6.8 |
| 4,401,362 | 8/1983 | Maeda | 350/6.8 |
| 4,423,426 | 12/1983 | Kitamura | 350/6.8 |
| 4,527,858 | 6/1985 | Takahashi et al. | 350/6.8 |
| 4,538,895 | 9/1985 | Higgins et al. | 350/6.8 |
| 4,571,035 | 2/1986 | Sakuma | 350/433 |
| 4,674,825 | 6/1987 | Tateoka et al. | 350/6.5 |
| 4,712,884 | 12/1987 | Sakuma et al. | 350/474 |

FOREIGN PATENT DOCUMENTS 8600720 1/1986 PCT Int'l Appl. .

Primary Examiner—John K. Corbin
Assistant Examiner—Jay Ryan
Attorney, Agent, or Firm—Sughrue, Mion, Zinn, Macpeak & Seas

[57] ABSTRACT

An optical system particularly for a laser beam printer comprising a semiconductor laser, a collimating lens, a cylindrical lens having curvature in the sub-scanning cross section, a deflector and anamorphic scanning lens system concentrating the light on a scanning plane. The anamorphic scanning lens system may have one to four lenses but has one lens with a convex toric surface facing the scanning plane. The anamorphic scanning lens system has stronger power in the sub-scanning cross section than in the main scanning cross section.

25 Claims, 16 Drawing Sheets

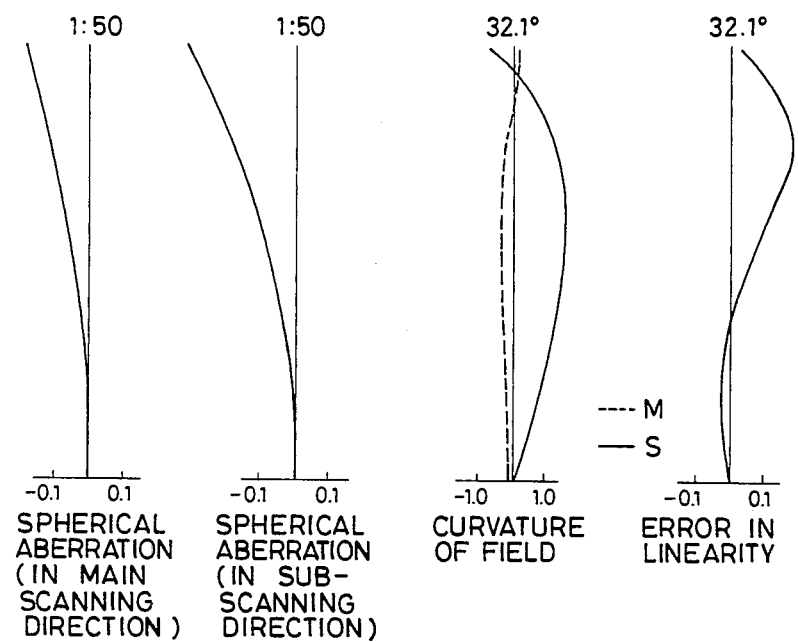

SCANNING OPTICAL SYSTEM FOR USE IN A LASER BEAM PRINTER

BACKGROUND OF THE INVENTION

1. Field of the Invention

The present invention relates to an improvement of a scanning optical system for use in a laser beam printer and other devices that employ a semiconductor laser as a light source.

2. Background of the Invention

The basic components of a scanning optical system in a laser beam printer are a light source that emits a light beam, a deflector for deflecting the emitted light beam and a scanning lens unit for concentrating the deflected beam at a position corresponding to the angle of deflection. In most cases, the light source is in the form of a small-sized and directly turnable semiconductor laser. Since a semiconductor laser emits divergent light, it is customarily used in combination with a collimator lens that is capable of producing a beam of parallel rays from the divergent light. The angle of divergence of light emitted from the semiconductor laser differs between a direction parallel to the plane of junction in the laser (this direction is hereinafter referred to as the parallel direction) and a direction perpendicular to the junction plane (this direction is hereinafter referred to as the perpendicular direction). The divergence in the perpendicular direction has a larger angle than in the parallel direction. As a result, the beam that has passed through a collimator lens has a larger diameter in the perpendicular direction than in the parallel direction and the beam that is finally concentrated on the scanning surface by the scanning lens unit has a smaller F number in the perpendicular direction than in the parallel direction. In other words, the spot diameter which is proportional to the F number of the concentrated beam is larger in the parallel direction than in the perpendicular direction.

In the prior art, various techniques have been employed to solve this problem. One is to reduce the effective aperture of the collimator lens at the expense of energy efficiency so as to restrict the beam in the perpendicular direction, thereby producing a substantially circular beam. Another approach is to effect beam shaping with an anamorphic optical device such as a prism.

The conventional scanning system has another disadvantage in that deflectors such as a rotating polygonal mirror is prone to the tilting of deflecting planes, which causes an error not only in the direction in which light scanning is effected (this direction is hereinafter referred to as the main scanning direction) but also in the direction perpendicular to that scanning direction (this direction is hereinafter referred to as the sub-scanning direction). This error will lead to unevenness in the pitch between scanning lines.

Various techniques have been proposed for compensating for the tilting of deflecting planes. In one method, an anamorphic optical unit is disposed in front of the deflector so that laser beam will be focused to form an image on the plane of deflection in a cross section as taken by cutting the scanning optical system in the sub-scanning direction. At the same time, an anamorphic scanning lens system is used to focus the laser light to form another image on the scanning plane so that the scanning plane and the plane of deflection will provide two conjugate planes to thereby eliminate any adverse effect of the tilting of deflecting planes. In another method, an anamorphic optical unit and an anamorphic scanning lens system are also used to reduce the focal length and the magnification of image in the sub-scanning direction sufficiently to reduce the adverse effects of the tilting of deflecting planes. However, the former method in which laser light is focused to form a linear image on the plane of deflection has the disadvantage that it is vulnerable to surface flaws or dust buildup on the plane of deflection. In addition, the image formed is highly sensitive to a change of the deflection point of the polygonal mirror. In the latter method, a complicated optical system is required to effect beam shaping and only insufficient compensation of the tilting of deflecting planes can be achieved.

The scanning lens unit used to concentrate a deflected beam on the scanning plane at a position corresponding to the angle of deflection is usually composed of an f-θ lens which is capable of attaining a proportional relationship between the angle of incidence and the height of image. However, in order to attain the proper proportionality between incident angle and image height (this relationship is hereinafter referred to as linearity), this f-θ lens has a strong negative distortion but this distortion is determinative to the purpose of reducing the error in the linearity between incident angle and image height to a very low level.

SUMMARY OF THE INVENTION

The present invention has been accomplished in order to solve the aforementioned problems of the prior art system. In particular an object of the present invention is to provide an improved scanning optical system in a laser beam printer and other devices that employ a semiconductor laser as a light source.

The invention can be summarized as an optical system for a scanned laser beam system in which light from a semiconductor laser passes through a collimator lens and a cylindrical lens to be focussed in the sub-scanning cross section in front of a deflector. The light then passes through an anamorphic lens system having greater power in the sub scanning direction than in the main scanning direction and having a lens with a convex toric surface facing a scanning plane on which the light is focused.

The system is improved in that it is capable of achieving not only the compensation of the tilting of deflecting planes but also beam shaping and that it permits scanning through a wide angle while experiencing a very small amount of deterioration of the linearity between the angle of incidence and the height of image.

BRIEF DESCRIPTION OF THE DRAWINGS

FIG. 1a shows the main scanning cross section of the system and FIG. 1b shows the sub-scanning cross section of the system.

FIG. 2a shows the main scanning cross section of the system and FIG. 2b shows the sub-scanning cross section of the system.

FIG. 9a shows the main scanning cross section of the system and FIG. 9b shows the sub-scanning cross section of the system.

FIG. 10a shows the main scanning cross section of the system and FIG. 10b shows the sub-scanning cross section of the system.

FIG. 14a shows the main scanning cross section of the system and FIG. 14b shows the sub-scanning cross section of the system.

FIG. 15a shows the main scanning cross section of the system and FIG. 15b shows the sub-scanning cross section of the system.

FIGS. 16 to 18 are graphs plotting the aberration curves obtained in Examples 11 to 13, respectively, of the scanning lens system in accordance with the third embodiment.

FIG. 19a shows the main scanning cross section of the system and FIG. 19b shows the sub-scanning cross section of the system.

FIG. 20b shows the sub-scanning cross section of the system.

DETAILED DESCRIPTION OF THE PREFERRED EMBODIMENTS

Several embodiments of the present invention are hereinafter described with reference to the accompanying drawing.

Figure 1A:
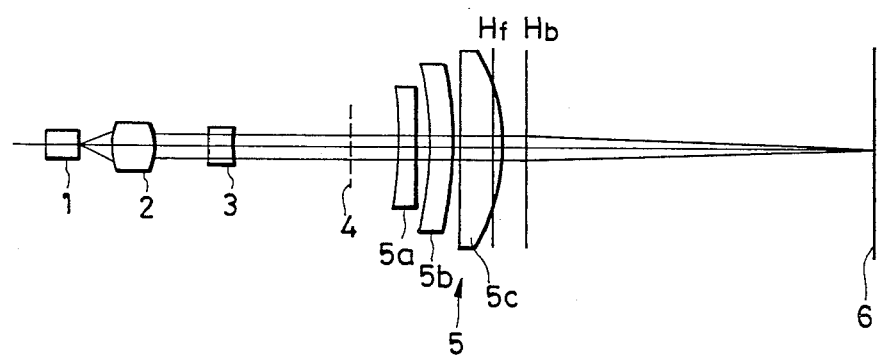
FIGS. 1a and 1b show the general layout of a scanning optical system according to a first embodiment of the present invention.
Figure 1B:
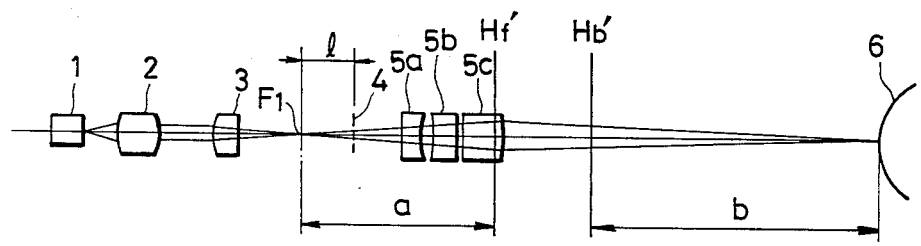

FIG. 1 shows the general layout of a scanning optical system for use in a laser beam printer in accordance with a first embodiment of the present invention. FIG. 1a shows a cross section that is taken by cutting this scanning optical system in the main scanning direction and which is hereinafter referred simply to as the main scanning cross section. FIG. 1b shows a cross section that is taken in the sub-scanning direction and which is hereinafter referred to simply as the sub-scanning cross section.

The scanning optical system shown in FIGS. 1a and 1b includes a semiconductor laser 1, a collimator lens 2 that produces a beam of generally parallel rays from the laser light emitted from the semiconductor laser 1, a cylindrical lens 3 that has a curvature in the sub-scanning cross section and which once performs a focusing of the laser light to form an image in said cross section, a deflector 4 that is disposed behind a point $F_1$ at which an image has been formed in the sub-scanning cross section as a result of focusing by the cylindrical lens 3, and an anamorphic scanning lens system 5 by which the deflected beam from the deflector 4 is concentrated on a scanning plane 6.

The anamorphic scanning lens system 5 is composed, in order from the side of the deflector 4, of three lens groups 5a, 5b and 5c. The first-group lens 5a is a negative lens that has a concave cylindrical surface with a curvature being present in the sub-scanning cross section. The second-group lens 5b is a convex meniscus lens that has its concave surface directed toward the side of the deflector 4. The third-group lens 5c has a planar surface on the side of the deflector 4 and a convex toric surface on the side of the scanning plane 6. The toric surface has a stronger curvature in the sub-scanning cross section.

In FIG. 1a, $H_f$ and $H_b$ signify the anterior and posterior principal points, respectively, in the main scanning cross section. In FIG. 1b, $H'_f$ and $H'_b$ signify the anterior and posterior principal points, respectively, in the sub-scanning cross section.

The first-group lens 5a in the scanning lens system 5 has a negative power in the main scanning cross section and achieves compensation of the spherical aberrations and coma that are generated in the positive second- and third-group lenses 5b and 5c. In addition, the first-group lens allows a laser beam to encounter the second- and third-group lenses 5b and 5c at a position distant from the optical axis so that a strong negative distortion will be produced to provide an f-$\theta$ lens having a good linearity between the angle of incidence and the height of image.

The second-group lens 5b has a meniscus configuration with the concave surface being directed toward the side of detector 4 and assists in the compensation of a curvature of the image field.

The third-group lens 5c produces a strong negative distortion on the side of its planar surface to produce an f-$\theta$ lens having a good linearity between the incident angle and the image height. In addition, this lens has a positive power on the convex surface side and serves to focus the beam to form an image on the scanning surface 5.

The scanning lens system 5 requires a stronger power in the sub-scanning cross section than in the main scanning cross section since the beam incident in the sub-scanning cross section is divergent. In the embodiment under discussion, the third-group lens 5c has a toric surfaced on the side of scanning surface 6 and produces a stronger curvature and, hence, a stronger positive power in the sub-scanning cross section than in the main scanning cross section. In addition, the power distribution between the toric surface and the negative cylindrical surface of the first-group lens 5a is such that the curvature of field developing in the sub-scanning direction can be compensated efficiently in spite of the wide range is scanning directions that are to be attained.

Furthermore, in the sub-scanning cross section, the cylindrical surface having a negative power is combined with the toric surface having a positive power so as to provide a "retrofocus" configuration which permits the principal points to be brought closer to the side of scanning surface 6. As a result, the magnification of the image that is formed on the scanning surface 6 by focusing with the scanning lens system 5 relative to the image formed on the first focal point $F_1$ can be reduced without increasing the overall size of the lens system.

Even better results can be attained if the first embodiment being discussed satisfies the following conditions. The first conditions to be met is:

$$0.03f < l < 0.25f \tag{1}$$

where $l$ is the distance between the first focal point $F_1$ and the plane of deflection in the sub-scanning cross section, and $f$ is the focal length of the scanning lens system 5 in the main scanning cross section.

The second condition to be met is:

$$1.7 < m < 2.7 \tag{2a}$$

where $m$ is the magnification of the image formed on the scanning surface 6 by focusing with the scanning lens system 5 relative to the image formed at the first focal point $F_1$ in the sub-scanning cross section.

The magnification $m$ is expressed as $b/a$, where $a$ is the distance between the first focal point $F_1$ and the frontal principal point $H'_f$ of the scanning lens system 5 in the sub-scanning cross section and where $b$ is the distance between the rear principal point $H'_b$ of the scanning lens system 5 and the position at which a focused image is formed on the scanning surface 6.

The first condition relates to the distance $l$ between the first focal point $F_1$ and the plane at the deflector 4. If $l$ is smaller than $0.03f$, the effective area on the plane of deflection is decreased to make the system vulnerable to surface flaws or dust buildup. In addition, the system will become highly sensitive to variation of the deflection point and may fail to ensure good performance over the full range of scanning angles. If $l$ exceeds $0.25f$, the necessary compensation of the tilting of deflecting planes cannot be attained and unevenness in the pitch of scanning lines may result.

The second condition relates to the magnification $m$ of the image formed on the scanning surface 6 by focusing with the scanning lens system 5 relative to the image formed on the first focal point $F_1$ in the sub-scanning cross section. If $m$ is smaller than 1.7, the scanning lens system 5 must be brought closer to the scanning surface in order to attain a specific value of $m$ and this may lead to a bulky lens system. In addition, the focal length in the sub-scanning direction becomes too short to achieve efficient beam shaping. If on the other hand, $m$ exceeds 2.7, the necessary compensation of the tilting of deflecting planes cannot be attained and, at the same time, the scanning plane 6 may become highly sensitive to the change of deflection point.

Figure 2A:
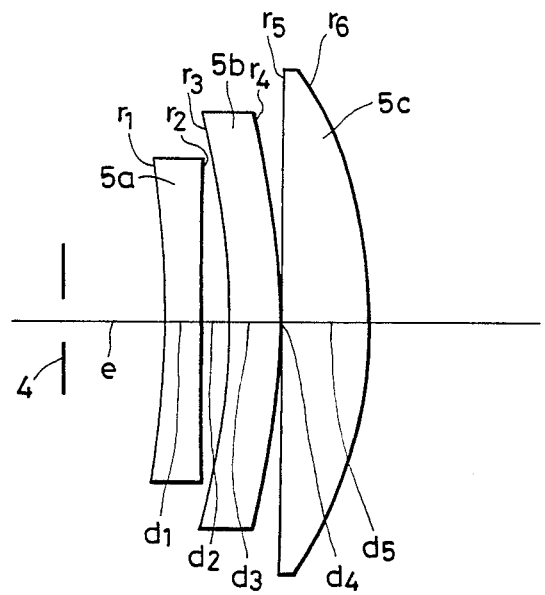
FIGS. 2a and 2b are schematic diagrams showing the arrangement of lenses in a scanning lens system which is one component of the first embodiment.
Figure 2B:
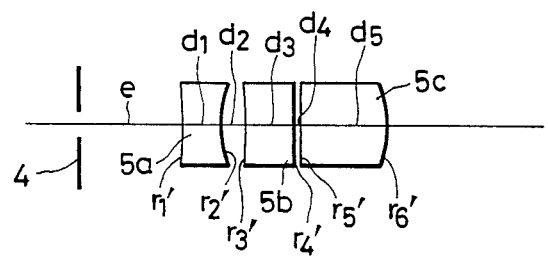
Figure 3:
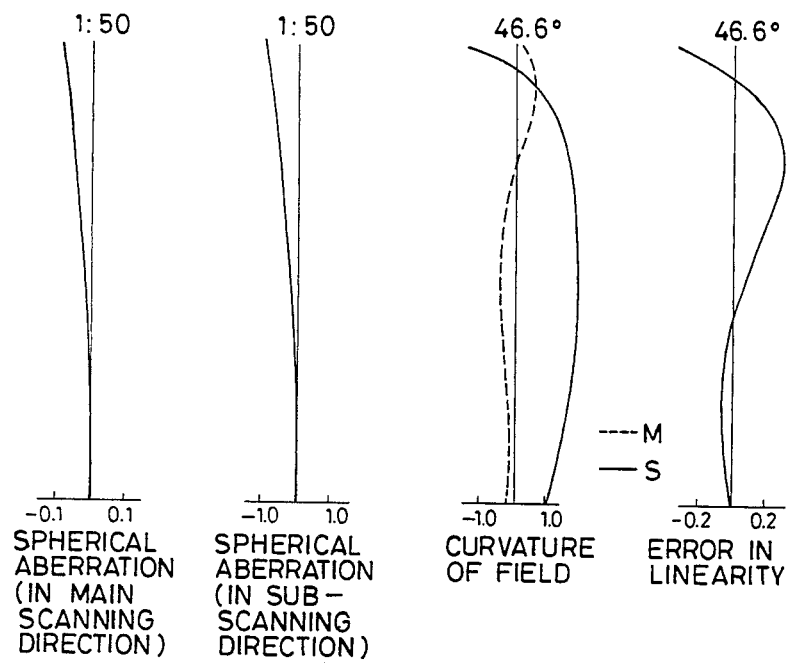
FIGS. 3 to 8 are graphs plotting the aberration curves obtained in Examples 1 to 6, respectively, of the scanning lens system in accordance with the first embodiment.
Figure 4:
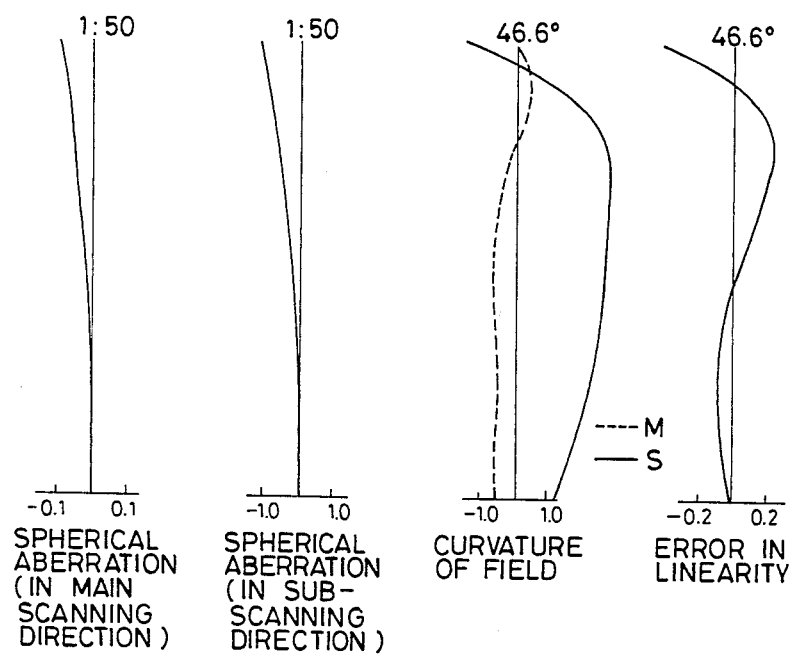
Figure 5:
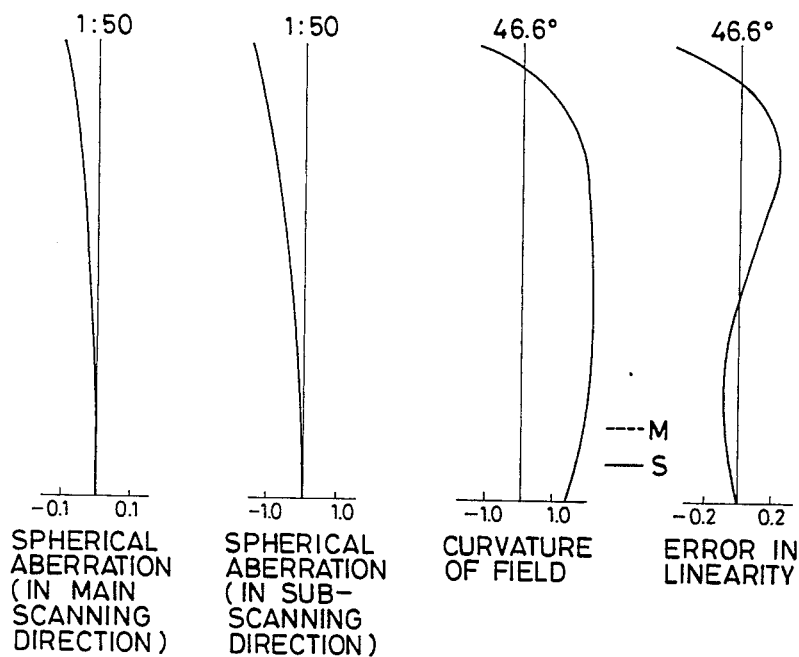
Figure 6:
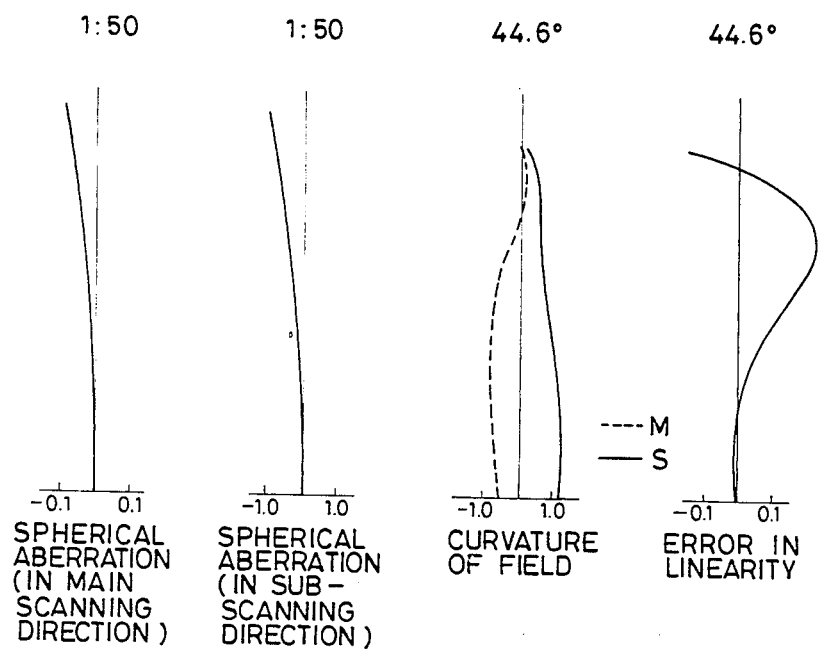
Figure 7:
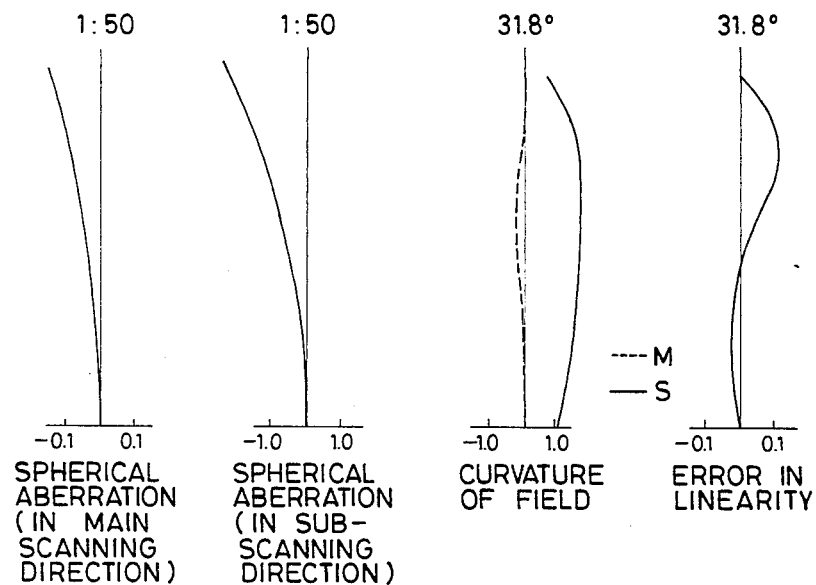
Figure 8:
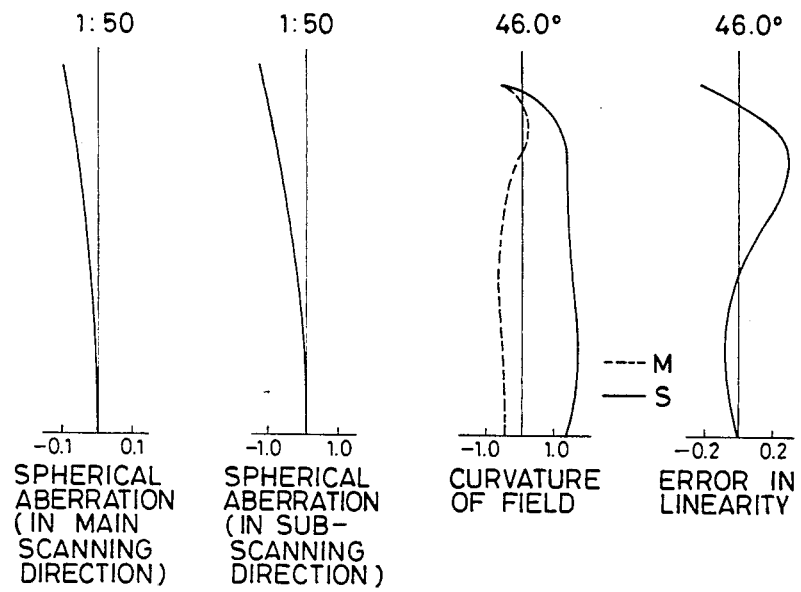

FIGS. 2a and 2b show a preferred configuration of the scanning lens system 5 that is a component of the optical scanning system according to the first embodiment of the present invention. Data sheets for the six illustrative examples of this preferred configuration are given below, wherein: $r_i$ signifies the radius of curvature in the main scanning cross section of the i-th surface as counted from the side of the deflector 4; $r'_i$ is the radius of curvature of the i-th plane in the sub-scanning cross section; $d_i$ is the thickness of the lens or the aerial distance between lenses having the i-th and (i+1)-th surfaces; $n_i$ is the refractive index of the group lens having surface $r_i$ and $r_{i+1}$ at the wavelength used; $e$ is the distance between a deflection point in the deflector 4 and the first surface $r_1$; $l$ is the distance between the deflection point and the first focal point in the sub-scanning cross section; $b$ is the distance between the scanning lens system and the scanning surface; and $f$ is the focal length in the main scanning direction.

EXAMPLE 1

| i | $r_i$ | $r'_i$ | $d_i$ | $n_i$ |
|---|---|---|---|---|
| 1 | −227.748 | −227.748 | 7.46 | 1.71230 |
| 2 | ∞ | 34.870 | 5.12 | |
| 3 | −168.731 | −168.731 | 10.00 | 1.60910 |
| 4 | −154.768 | −154.768 | 0.50 | |
| 5 | ∞ | ∞ | 16.80 | 1.71230 |
| 6 | −88.050 | −26.170 | | |
| | e = 19.90 | b = 175.31 | | |
| | l = 0.13f | f = 159.55 | m = 1.9 | |

EXAMPLE 2

| i | $r_i$ | $r'_i$ | $d_i$ | $n_i$ |
|---|---|---|---|---|
| 1 | −224.410 | −224.410 | 7.00 | 1.73814 |
| 2 | ∞ | 27.470 | 4.58 | |
| 3 | −164.214 | −164.214 | 10.00 | 1.60910 |
| 4 | −151.400 | −151.400 | 0.50 | |
| 5 | ∞ | ∞ | 16.27 | 1.73814 |
| 6 | −89.509 | −24.180 | | |
| | e = 21.56 | b = 175.44 | | |
| | l = 0.06f | f = 159.18 | m = 2.2 | |

EXAMPLE 3

| i | $r_i$ | $r'_i$ | $d_i$ | $n_i$ |
|---|---|---|---|---|
| 1 | −225.620 | −225.620 | 7.95 | 1.71230 |
| 2 | ∞ | 32.200 | 4.83 | |
| 3 | −189.738 | −189.738 | 10.20 | 1.60910 |
| 4 | −166.077 | −166.077 | 0.40 | |
| 5 | ∞ | ∞ | 16.80 | 1.71230 |
| 6 | −88.700 | −25.10 | | |
| | e = 20.23 | b = 174.85 | | |
| | l = 0.10f | f = 159.44 | m = 2.0 | |

EXAMPLE 4

| i | $r_i$ | $r'_i$ | $d_i$ | $n_i$ |
|---|---|---|---|---|
| 1 | −176.700 | −176.700 | 11.19 | 1.71230 |
| 2 | ∞ | 53.2 | 3.60 | |
| 3 | −173.952 | −173.952 | 7.50 | 1.51072 |
| 4 | −128.547 | −128.547 | 0.50 | |
| 5 | ∞ | ∞ | 17.00 | 1.71230 |
| 6 | −76.90 | −25.5 | | |
| | e = 19.42 | b = 149.28 | | |
| | l = 0.12f | f = 134.65 | m = 2.0 | |

EXAMPLE 5

| i | $r_i$ | $r'_i$ | $d_i$ | $n_i$ |
|---|---|---|---|---|
| 1 | −159.750 | −159.750 | 12.00 | 1.71230 |
| 2 | ∞ | 61.6 | 6.30 | |
| 3 | −850.409 | −850.409 | 12.30 | 1.51072 |
| 4 | −172.480 | −172.480 | 2.70 | |
| 5 | ∞ | ∞ | 17.40 | 1.71230 |
| 6 | −144.50 | −40.5 | | |
| | e = 42.45 | b = 303.20 | | |
| | l = 0.09f | f = 269.74 | m = 2.3 | |

EXAMPLE 6

| i | $r_i$ | $r'_i$ | $d_i$ | $n_i$ |
|---|---|---|---|---|
| 1 | −193.485 | −193.485 | 11.40 | 1.71230 |
| 2 | ∞ | 51.3 | 4.37 | |
| 3 | −220.000 | −220.000 | 7.95 | 1.51072 |
| 4 | −166.058 | −166.058 | 0.50 | |
| 5 | ∞ | ∞ | 17.00 | 1.71230 |
| 6 | −86.50 | −26.95 | | |
| | e = 21.120 | b = 175.7 | | |
| | l = 0.10f | f = 159.35 | m = 2.2 | |

FIGS. 3 to 8 are graphs plotting the aberration curves obtained in Examples 1 to 6 respectively.

Each of the figures contain four graphs. The first graph plots spherical aberration in the main scanning direction as a function of aperture. The second graph is similar to the first but is for the sub-scanning direction. The third graph is a plot of the curvature of the image field in the main scanning direction (M) and in the sub-scanning direction (S) as a function of viewing angle. The fourth graph is a plot of the error in linearity as a function of viewing angle.

A second embodiment of the present invention is hereinafter described with reference to FIGS. 9a to 13.

Figure 9A:
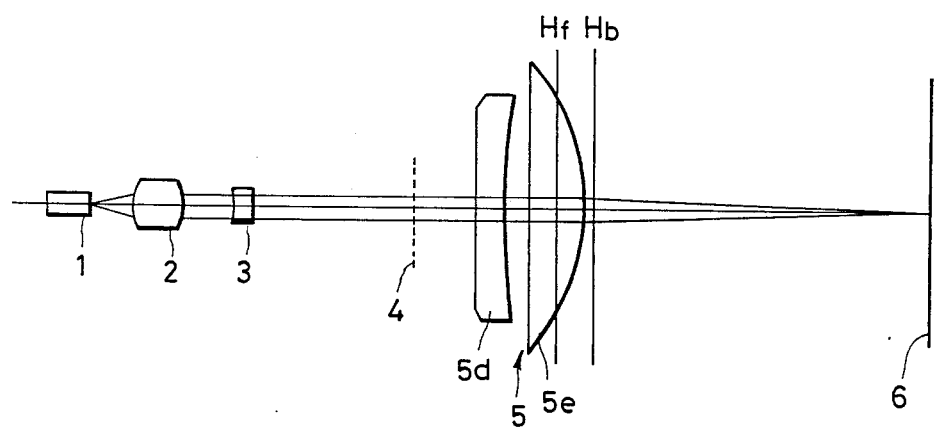
FIGS. 9a and 9b show the general layout of a scanning optical system according to a second embodiment of the present invention.
Figure 9B:
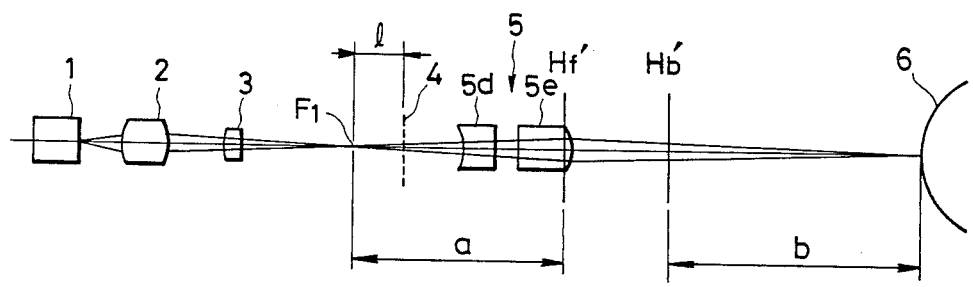

FIGS. 9a and 9b show the general layout of a scanning optical system for use in a laser beam printer in accordance with the second embodiment of the present invention. FIG. 9a is a cross section that is taken by sectioning this scanning optical system in the main scanning direction and which is hereinafter referred to simply as the main scanning cross section. FIG. 9b is a cross section that is taken in the sub-scanning direction and which is hereinafter referred to simply as the sub-scanning cross section.

The scanning optical system shown in FIGS. 9a and 9b consists of the semiconductor laser 1, the collimator lens 2 that produces a beam of generally parallel rays from the laser light emitted front the semiconductor laser 1, the cylindrical lens 3 that has a curvature in the sub-scanning cross section and which once performs a focusing of the laser light to form an image in the sub-scanning cross section, the deflector 4 that is disposed behind a point $F_1$ at which an image is formed in the sub-scanning cross section as a result of focusing by the cylindrical lens 3, and an anamorphic scanning lens system 5 by which the deflected beam from the deflector 4 is concentrated on a scanning plane 6. The scanning lens system 5 is composed, in order from the side of the deflector 4, of two lens groups 5d and 5e. The first-group lens 5d is a negative lens that has a concave cylindrical surface with a curvature being present in the sub-scanning cross section. The second-group lens 5e has a planar surface on the side of the deflector 4 and a convex toric surface on the side of the scanning plane 6. The toric surface has a stronger curvature in the sub-scanning cross section.

In FIG. 9 $H_f$ and $H_b$ signify the anterior and posterior principal points, respectively, in the main scanning cross section. Further, in FIG. 9b, $H'_f$ and $H'_b$ signify the anterior and posterior principal points, respectively, in the sub-scanning cross section.

The first-group lens 5d in the scanning lens system 5 has a negative power in the main scanning cross section and achieves compensation of the spherical aberrations and coma that are generated in the positive second-group lens 5e. In addition, the first-group lens 6d allows a laser beam to encounter the second-group lens 5e at a position distant from the optical axis so that a strong negative distortion is produced to provide an f-$\theta$ lens having a good linearity between the angle of incidence and the height of image.

The second-group lens 5e produces a strong negative distortion on the side of its planar surface to produce an f-$\theta$ lens having good linearity between the incident angle and the image height. In addition, this lens has a positive power on the convex surface side and serves to focus the beam to form an image on the scanning plane 6.

The scanning lens system 5 requires a stronger power in the sub-scanning cross section than in the main scanning cross section since the beam incident in the sub-scanning cross section is divergent. In the embodiment under discussion, the second-group lens 5e has a toric surface on the side of scanning plane 6 and produces a larger curvature and, hence, a stronger positive power in the sub-scanning cross section than in the main scanning cross section. In addition, the power distribution between the toric surface and the negative cylindrical surface of the first-group lens 5d is such that the curvature of field developing in the sub-scanning direction can be compensated efficiently in spite of the wide range of scanning directions that are to be attained.

Furthermore, in the sub-scanning cross section, the cylindrical surface having a negative power is combined with the toric surface having a positive power so as to provide a "retrofocus" configuration which permits the principal points to be brought closer to the side of scanning surface 6. As a result, the magnification of the image that is formed on the scanning surface 6 by focusing with the scanning lens system 5 relative to the image formed on the first focal point $F_1$ can be reduced without increasing the overall size of the lens system.

Even better results can be attained if the second embodiment being discussed satisfies the following conditions. The first condition to be met is $$0.03f < l < 0.25f \tag{1}$$

where l is the distance between the first focal point $F_1$ and the plane of deflection in the sub-scanning cross section, and f is the focal length of the scanning lens system 5 in the main scanning cross section.

The second condition to be met is:

$$1.1 < m < 1.7 \tag{2b}$$

where m is the magnification of the image formed on the scanning surface 6 by focusing with the scanning lens system 5 relative to the image formed at the first focal point $F_1$ in the sub-scanning cross section.

The magnification m is expressed as b/a, where a is the distance between the first focal point $F_1$ and the frontal principal point $H'_f$ of the scanning lens system 5 in the sub-scanning cross section and where b is the distance between the rear principal point $H'_b$ of the scanning lens system 5 and the position at which an focused image is formed on the scanning surface 6.

The third condition to be met is:

$$0.15f < |f_1'| < 0.35f \tag{3}$$

where $f_1'$ is the focal length of the first-group lens 5d in the sub-scanning cross section, and f is the focal length of the scanning lens system in the main scanning cross section.

The first condition and second condition have previously been discussed. However, note the numerical difference between the second conditions (2a) and (2b).

The third condition relates to the negative refractive power of the first-group lens 5d in the sub-scanning cross section. If $|f_1'|$ is less than 0.15f, the negative refractive power of that lens increases and the beam incident upon the second-group lens 5e spreads so much in the sub-scanning cross section as to produce great aberrations on the toric surface. In addition, any offset in the incident beam that occurs in the sub-scanning cross section will produce an even larger off set in the beam on the toric surface, thereby causing an extreme deterioration of the system performance. If, on the other hand, $|f_1'|$ exceeds 0.35f, the negative refractive power of the first-group lens 5d in the sub-scanning cross section becomes too small to bring the principal points in that cross section adequately closer to the scanning surface 6 and this causes an increase in the magnification of the image formed on the scanning surface 6 by focusing with the scanning lens system 5 relative to the image formed on the first focal point $F_1$.

Figure 10A:
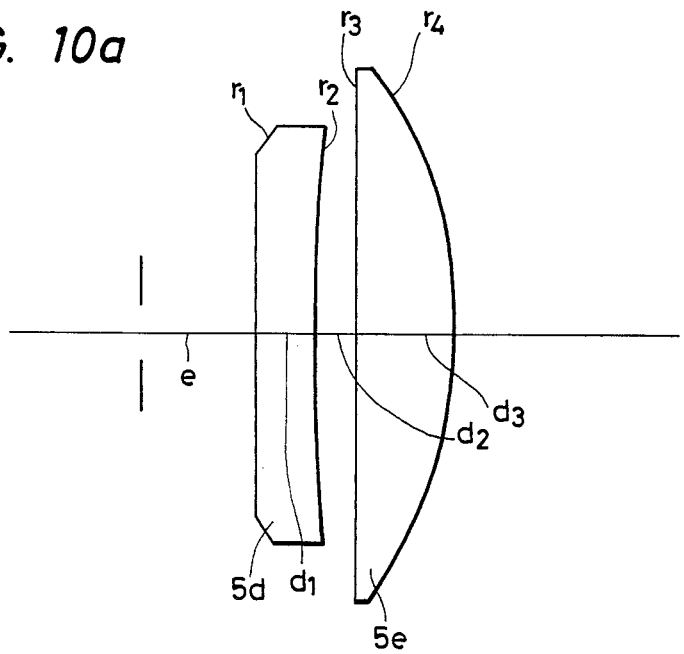
FIGS. 10a and 10b are schematic diagrams showing the arrangement of lenses in a scanning lens system which is one component of the second embodiment.
Figure 10B:
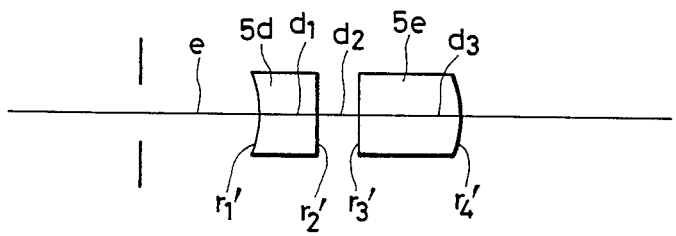

FIGS. 10a and 10b show a preferred configuration of the scanning system 5 that is a component of the optical scanning system according to the second embodiment of the present invention. Data sheets for the three illustrative examples, Examples 7, 8 and 9, of this preferred configuration are given below.

The meaning of the symbols in the same as previously described for Examples 1–6.

EXAMPLE 7

| i | $r_i$ | $r'_i$ | $d_i$ | $n_i$ |
|---|---|---|---|---|
| 1 | ∞ | −22.4 | 10.95 | 1.60910 |
| 2 | 392.892 | 392.892 | 8.59 | |
| 3 | ∞ | ∞ | 19.50 | 1.76591 |
| 4 | −82.70 | −25.5 | | |
| e = 22.93 | b = 127.89 | | | |
| l = 0.13f | m = 1.3 | f = 125.11 | $|f_1'|$ = 0.28f | |

EXAMPLE 8

| i | $r_i$ | $r'_i$ | $d_i$ | $n_i$ |
|---|---|---|---|---|
| 1 | ∞ | −32.5 | 8.90 | 1.71230 |
| 2 | 423.000 | 423.000 | 7.94 | |
| 3 | ∞ | ∞ | 21.96 | 1.76591 |
| 4 | −82.000 | −26.2 | | |
| e = 24.19 | b = 128.26 | | | |
| l = 0.13f | m = 1.4 | f = 125.36 | $|f_1'|$ = 0.34f | |

EXAMPLE 9

| i | $r_i$ | $r'_i$ | $d_i$ | $n_i$ |
|---|---|---|---|---|
| 1 | ∞ | −22.3 | 9.89 | 1.71230 |
| 2 | 425.000 | 425.000 | 10.23 | |
| 3 | ∞ | ∞ | 22.60 | 1.76591 |
| 4 | −87.75 | −26.5 | | |
| e = 25.93 | b = 139.27 | | | |
| l = 0.11f | m = 1.3 | f = 135.33 | $|f_1'|$ = 0.22f | |

Figure 11:
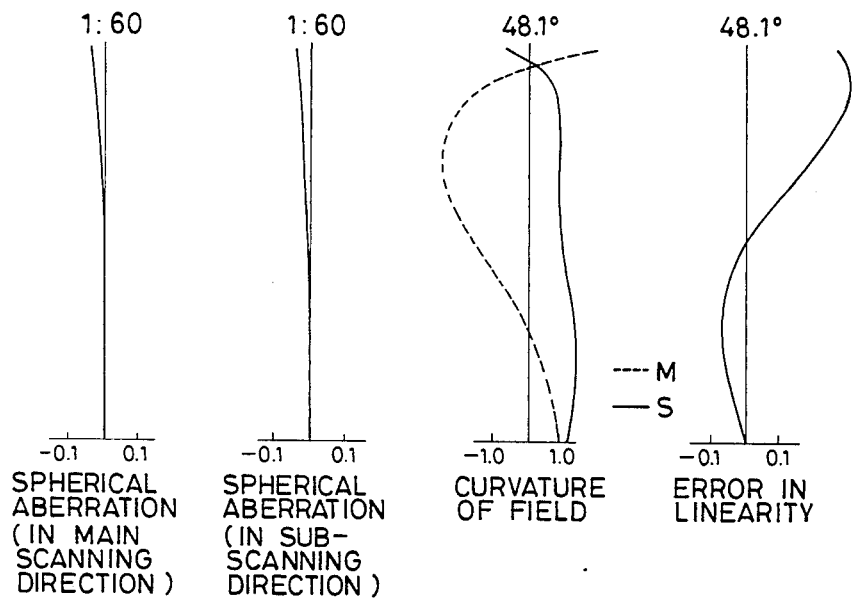
FIGS. 11 to 13 are graphs plotting the aberration curves obtained in Examples 7 to 10, respectively, of the scanning lens system in accordance with the second embodiment.
Figure 12:
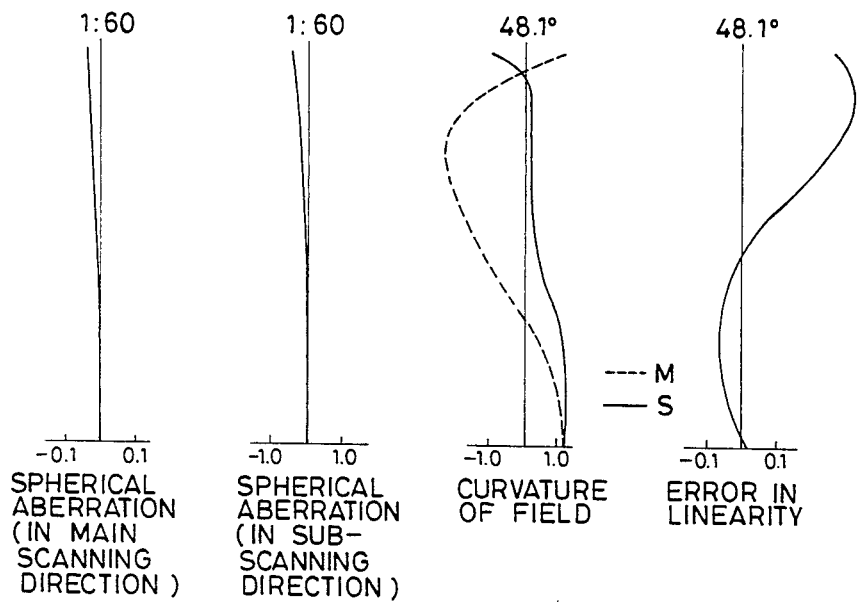
Figure 13:
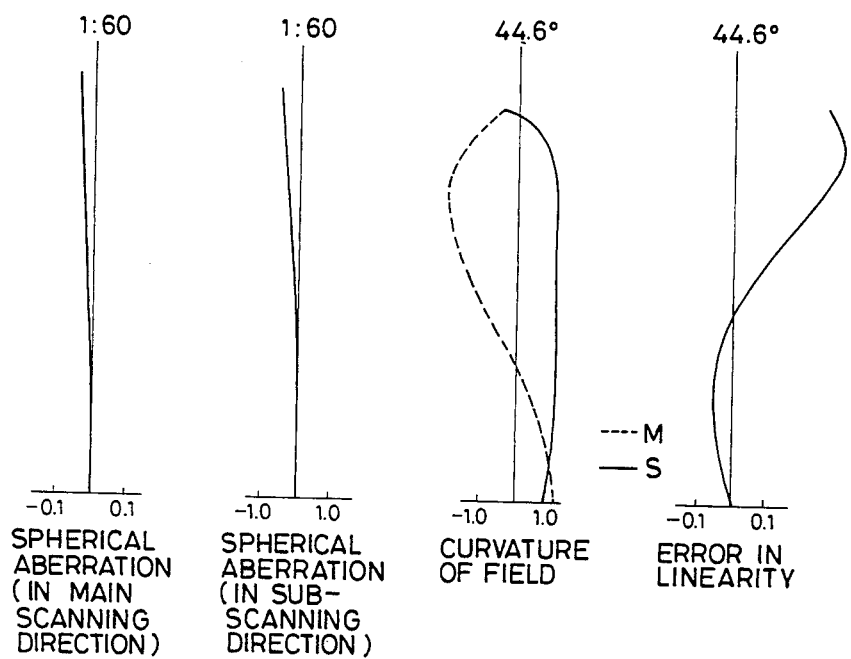

FIGS. 11 to 13 are graphs plotting the aberration curves obtained in Examples 7 to 9, respectively. The explanation of the content of such graphs has previously been presented.

A third embodiment of the present invention is hereinafter described with reference to FIGS. 14a to 18.

Figure 14A:
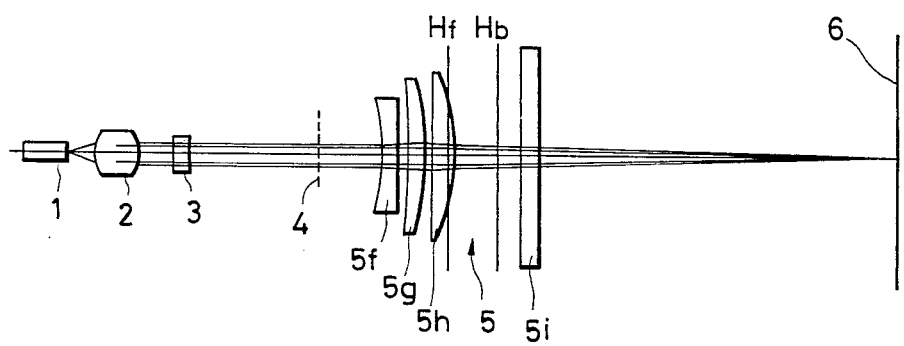
FIGS. 14a and 14b shows the general layout of a scanning optical system according to a third embodiment of the present invention.
Figure 14B:
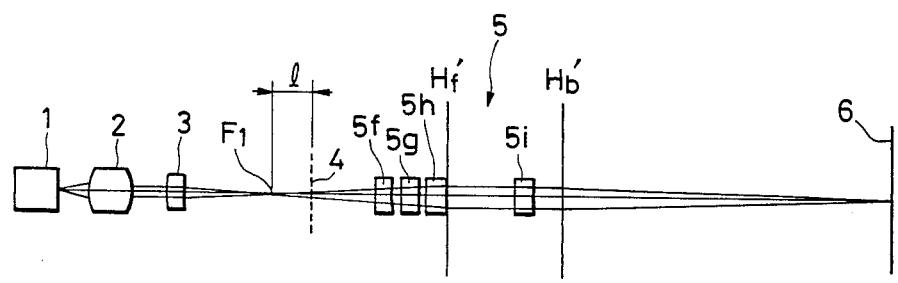

FIGS. 14a and 14b show the general layout of a scanning optical system for use in a laser beam printer in accordance with the third embodiment of the present invention. FIG. 14a shows a cross section that is taken by cutting this scanning optical system in the main scanning direction and which is hereinafter referred to simply as the main scanning cross section. FIG. 14b shows a cross section that is taken in the sub-scanning direction and which is hereinafter referred to simply as the sub-scanning cross section.

The scanning optical system shown in FIG. 14 consists of the semiconductor laser 1, the collimator lens 2 that produces generally a beam of parallel rays from the laser light emitted from the semiconductor laser 1, the cylindrical lens 3 that has a curvature in the sub-scanning cross section and which once performs a focusing of the laser light to form an image in the sub-scanning cross section, the deflector 4 that is disposed behind a point $F_1$ at which an image is formed in the sub-scanning cross section as a result of focusing by the cylindrical lens 3, and an anamorphic scanning lens system 5 by which the deflected beam form the deflector 4 is concentrated on the scanning plane 6. The scanning lens system 5 is composed, in order from the side of the deflector 4, of four lens groups 5f, 5g, 5h and 5i. The first-group lens 5f is a negative lens that has a concave cylindrical surface with a curvature being present in the sub-scanning cross section. The second-group lens 5g is a convex meniscus lens that has its concave surface directed toward the side of the deflector 4. The third-group lens 5h has a planar surface of the side of the deflector 4 and a convex toric surface on the side of the scanning plane 6 which has a stronger curvature in the sub-scanning cross section. The fourth-group lens 5i has a convex cylindrical surface which has a curvature in the sub-scanning cross section.

In FIG. 14a, $H_f$ and $H_b$ signify the anterior and posterior principal points, respectively, in the main scanning cross section. In FIG. 14b, $H'_f$ and $H'_b$ signify the anterior and posterior principal points, respectively, in the sub-scanning cross section.

The first-group lens 5f in the scanning lens system 5 has a negative power in the main scanning cross section and achieves compensation of the spherical aberrations and coma that are generated in the positive second- and third-group lenses 5g and 5h. In addition, the first-group lens 5f allows a laser beam to encounter the second- and third-group lenses 5g and 5h at a position distant from the optical axis so that a strong negative distortion will be produced to provide an f-θ lens having a good linearity between the angle of incidence and the height of image.

The second-group lens 5g has a meniscus configuration with the concave surface being directed toward the side of the deflector 4 and assists in the compensation of the curvature of field.

The third-group lens 5h produces a strong negative distortion on the side of its planar surface to produce an f-θ lens having a good linearity between the incident angle and the image height. In addition, this lens has a positive power on the convex surface side and serves to focus the beam to form an image on the scanning plane 6. The fourth-group lens 5i has no power in the main scanning cross section.

The scanning lens system 5 requires a stronger power in the sub-scanning cross section than in the main scanning cross section since the beam incident in the sub-scanning cross section is divergent. In the embodiment under discussion, the third-group lens 5h has a toric surface on the side of scanning plane 6 and the fourth-group lens has a convex cylindrical surface, so that a greater positive power can be attained in the sub-scanning cross section that in the main scanning cross section. In addition, the power distribution between the aforementioned surfaces 5f and the negative cylindrical surface of the first-group lens 5f is such that the curvature of field developing in the sub-scanning direction can be compensated efficiently in spite of the wide range of scanning angles that are to be attained.

Furthermore, in the sub-scanning cross section, the cylindrical surface having a negative power, the toric surface having a positive power and the convex cylindrical surface are combined such as to provide a "retrofocus" configuration. Because of the combination of one toric surface with two cylindrical surfaces, the system according to the third embodiment of the present invention is particularly effective in bringing the principal points closer to the scanning plane 6. As a result, the magnification of the image that is formed on the scanning plane 6 by focusing with the scanning lens system 5 relative to the image formed on the scanning plane 6 by focusing with the scanning lens system 5 relative to the image formed on the first focal point $F_1$ can be sufficiently reduced to attain a greater effect of compensating for the tilting of deflection planes.

Compared with a conventional system which depends solely on a convex cylindrical lens for compensation of the tilting of deflection planes, the system according to the third embodiment of the present invention achieves effective compensation for a curvature of field and yet permits the cylindrical lenses to be brought closer to the deflector 4, thereby contributing to a reduction in the overall size of the system.

Even better results can be attained if the third embodiment being discussed satisfies the following conditions. The first conditions to be met is:

$$0.03f < l < 0.25f \qquad (1)$$

where l is the distance between the first focal point $F_1$ and the plane of deflection in the sub-scanning cross section, and f if the focal length of the scanning lens system 5 in the main scanning cross section.

The second condition to be met is:

$$0.8 < m < 2.0 \qquad (2c)$$

where m is the magnification of the image formed on the scanning surface 6 by focusing with the scanning lens system 5 relative to the image formed at the first focal point $F_1$ in the sub-scanning cross section.

The magnification m is expressed as b/a, where a is the distance between the first focal pint $F_1$ and the frontal principal point $H'_1$ of the scanning lens system 5 in the sub-scanning cross section and where b is the distance between the rear principal point $H'_b$ of the scanning lens system 5 and the position at which a focused image is formed on the scanning surface 6.

The first and second conditions have previously been described. Again note the differences of the numerical values of the limits for conditions (2a), (2b) and (2c). Also, in condition (2c), if m is smaller than 0.8 the fourth group lens 5i must in particular be brought closer to the scanning surface.

Figure 15A:
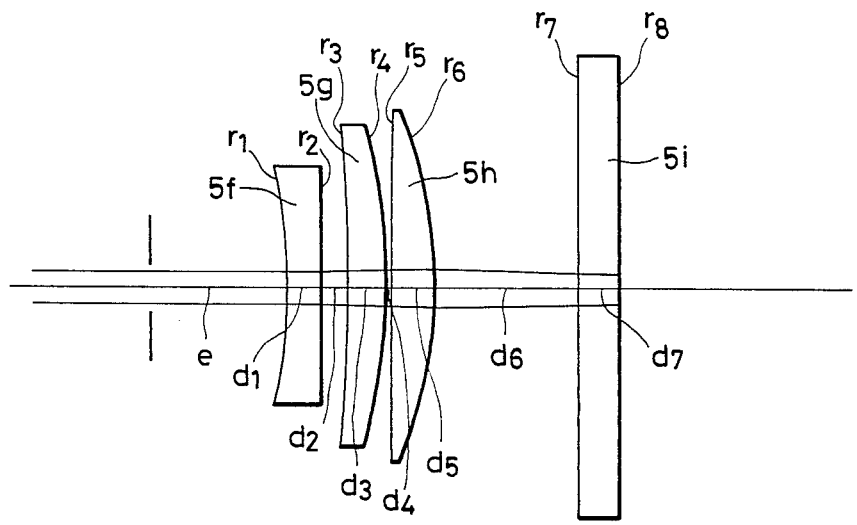
FIGS. 15a and 15b are schematic diagrams showing the arrangement of lenses in a scanning lens system which is one component of the third embodiment.
Figure 15B:
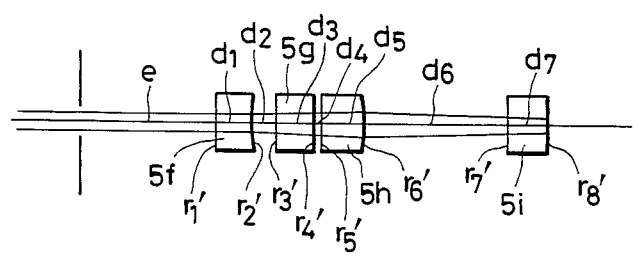

FIGS. 15a and 15b show a preferred configuration of the scanning lens system 5 that is a component of the optical scanning system according to the third embodiment of the present invention. Data sheets for the three illustrative examples Examples 10, 11 and 12 of this preferred configuration are given below.

The meaning of the symbols has been presented before.

EXAMPLE 10

| i | $r_i$ | $r'_i$ | $d_i$ | $n_i$ |
|---|---|---|---|---|
| 1 | −177.221 | −177.221 | 12.96 | 1.71230 |
| 2 | ∞ | 60.68 | 9.09 | |
| 3 | −714.254 | −714.254 | 14.79 | 1.51072 |
| 4 | −201.889 | −201.889 | 2.01 | |
| 5 | ∞ | ∞ | 15.94 | 1.71230 |
| 6 | −152.654 | −52.88 | 51.85 | |
| 7 | ∞ | ∞ | 15.00 | 1.51072 |
| 8 | ∞ | −154.56 | | |
| | e = 50.00 | b = 278.72 | | |
| | l = 0.10f | f = 299.75 | m = 1.8 | |

EXAMPLE 11

| i | $r_i$ | $r'_i$ | $d_i$ | $n_i$ |
|---|---|---|---|---|
| 1 | −218.512 | −218.512 | 17.65 | 1.63552 |
| 2 | ∞ | 20.6 | 5.46 | |
| 3 | −267.583 | −267.583 | 9.60 | 1.51072 |
| 4 | −199.640 | −199.640 | 0.60 | |
| 5 | ∞ | ∞ | 19.11 | 1.68443 |
| 6 | −102.54 | −37.60 | 48.59 | |
| 7 | ∞ | ∞ | 9.60 | 1.51072 |
| 8 | ∞ | −55.53 | | |
| | e = 24.03 | b = 156.44 | | |
| | l = 0.16f | f = 191.52 | m = 0.9 | |

EXAMPLE 12

| i | $r_i$ | $r'_i$ | $d_i$ | $n_i$ |
|---|---|---|---|---|
| 1 | −194.926 | −194.926 | 12.12 | 1.71230 |
| 2 | ∞ | 38.96 | 8.71 | |
| 3 | −654.385 | −654.385 | 12.36 | 1.51072 |
| 4 | −211.817 | −211.817 | 1.91 | |
| 5 | ∞ | ∞ | 17.71 | 1.71230 |
| 6 | −142.685 | −46.87 | 54.90 | |
| 7 | ∞ | 114.53 | 13.40 | 1.51072 |
| 8 | ∞ | ∞ | | |
| | e = 39.50 | b = 235.32 | | |
| | l = 0.14f | f = 267.76 | m = 1.4 | |

Figure 16:
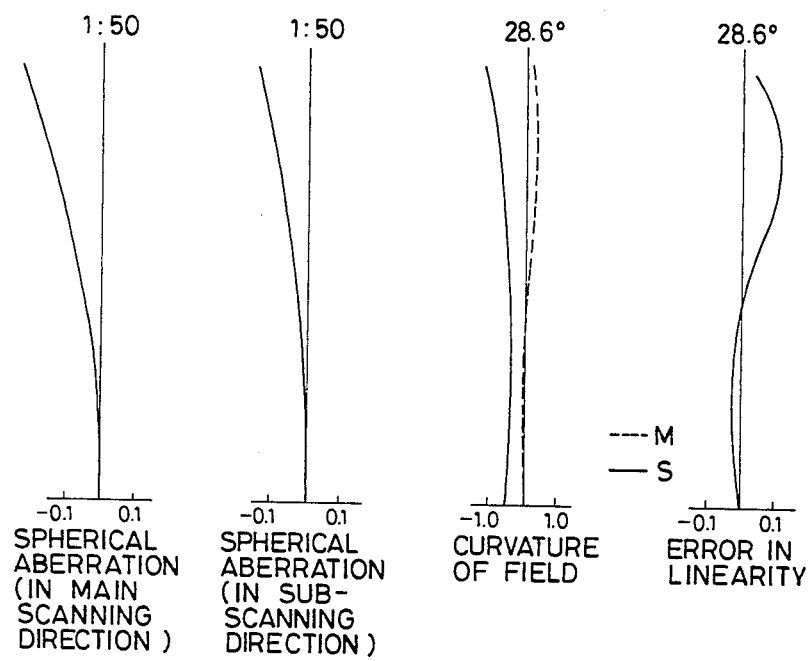
Figure 17:
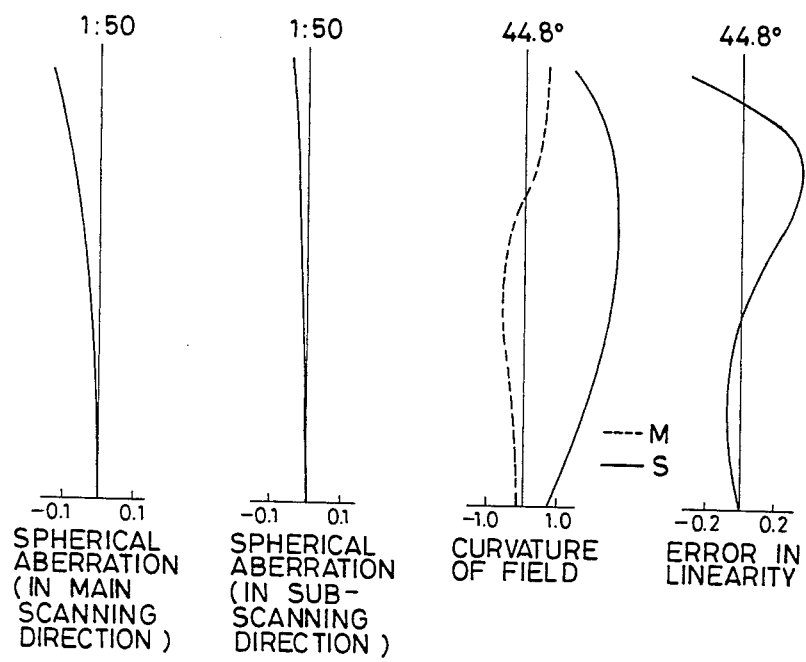

FIGS. 16 to 18 are graphs plotting the aberration curves obtained in Examples 11 to 13, respectively. Their content has previously been explained.

A fourth embodiment of the present invention is hereinafter described with reference to FIGS. 19a to 23.

Figure 19A:
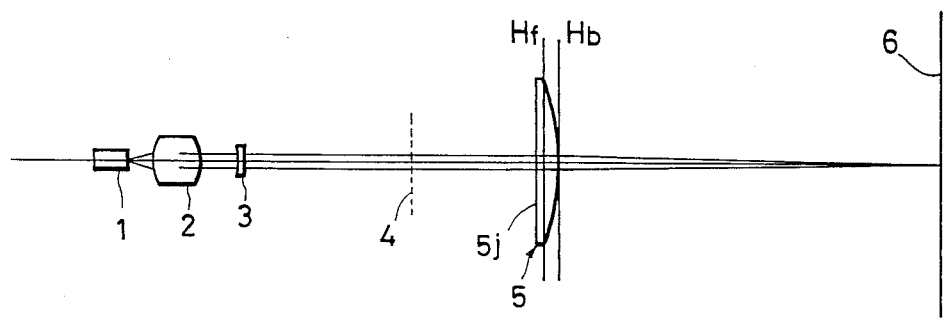
FIGS. 19a and 19b show the general layout of a scanning optical system according to a fourth embodiment of the present invention.
Figure 19B:
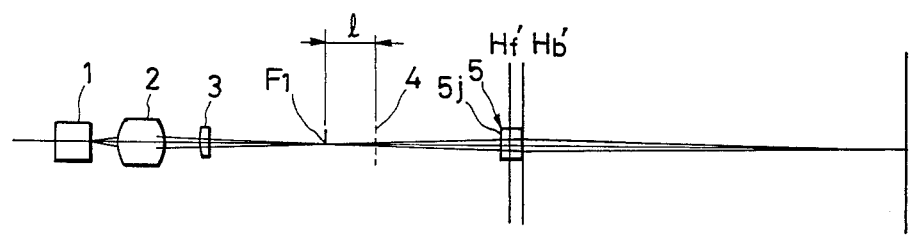

FIGS. 19a and 19b shows the general layout of a scanning optical system for use in a laser beam printer in accordance with the fourth embodiment of the present invention. FIG. 19b shows a cross section that is taken by cutting this scanning optical system in the main scanning direction and which is hereinafter referred to simply as the main scanning cross section. FIG. 19b shows a cross section that is taken in the sub-scanning direction and which is hereinafter referred to simply as the sub-scanning cross section.

The scanning optical system shown in FIGS. 19a and 19b consists of the semiconductor laser 1, the collimator lens 2 that produces a beam of generally parallel rays from the laser light emitted from the semiconductor laser 1, the cylindrical lens 3 that has a curvature in the sub-scanning cross section and which once performs a focusing of the laser light to form an image in the sub-scanning cross section, the deflector 4 that is disposed behind a point $F_1$ at which an image is formed in the sub-scanning cross section as a result of focusing by the cylindrical lens 3, and an anamorphic scanning lens system 5 by which the deflected beam from the deflector 4 is concentrated on the scanning plane 6. The scanning lens system 5 is composed of a single lens group $5j$ that has a convex toric surface on the side of the scanning plane 6 which has a stronger curvature in the sub-scanning cross section.

In FIG. 19a, $H_f$ and $H_b$ signify the anterior and posterior principal points, respectively, in the main scanning cross section. In FIG. 19b, $H'_f$ and $H'_b$ signify the anterior and posterior principal points, respectively, in the sub-scanning cross section.

The scanning lens system 5 allows a laser beam to encounter a plane of the deflector side in the main scanning cross section at a position distant from the optical axis so that a strong negative distortion is produced to provide an f-θ lens having a good linearity between the angle of incidence and the height of image. In addition, the positive power of the convex surface on the side of scanning plane serves to form a focused image of beam on the scanning plane 6.

The scanning lens system 5 requires a stronger power in the sub-scanning cross section than in the main scanning cross section since the beam incident in the sub-scanning cross section is divergent. In the embodiment under discussion, the scanning lens $5j$ has a toric surface on the side of scanning plane 6 and has a stronger curvature and, hence, produces a stronger positive power in the sub-scanning cross section than in the main scanning cross section. In addition, if the scanning lens $5j$ has a concave cylindrical surface on the deflector side that has a curvature in the sub-scanning cross section, the power distribution between this cylindrical surface and the toric surface is such that it is advantageous for the purpose of compensating for the curvature of field occurring in the sub-scanning direction.

Furthermore, in the sub-scanning cross section, the cylindrical surface having a negative power is combined with the toric surface having a positive power so as to provide a "retrofocus" configuration which permits the principal points to be brought closer to the side of scanning surface 6. As a result, the magnification of the image that is formed on the scanning surface 6 by focusing with the scanning lens system 5 relative to the image formed on the first focal point $F_1$ can be reduced without increasing the overall size of the lens system.

Even better results can be attained if the second embodiment being discussed satisfies the following conditions. The first condition to be met is $$0.03f < 1 < 0.25f \quad (1)$$

where l if the distance between the first focal point $F_1$ and the plane of deflection in the sub-scanning cross section, and f if the focal length of the scanning lens system 5 in the main scanning cross section.

The second condition to be met is:

$$1.7 < m < 2.7 \quad (2a)$$

where m is the magnification of the image formed on the scanning surface 6 by focusing with the scanning lens system 5 relative to the image formed at the first focal point $F_1$ in the sub-scanning cross section.

The magnification m is expressed as b/a, where a is the distance between the first focal point $F_1$ and the frontal principal point $H'_f$ of the scanning lens system 5 in the sub-scanning cross section and where b is the distance between the rear principal point $H'_b$ of the scanning lens system 5 and the position at which a focused image is formed on the scanning surface 6.

These two conditions are the same as for the first embodiment and their relevance is discussed there.

Figure 20A:
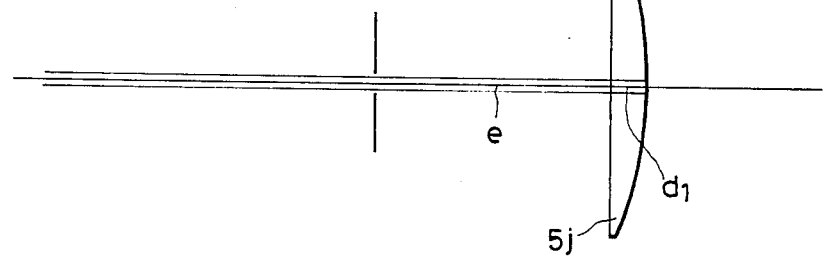
FIGS. 20a and 20b are schematic diagrams showing the arrangement of lenses in a scanning lens system which is one component of the fourth embodiment.
Figure 20B:
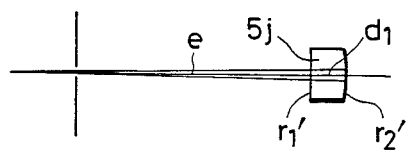

FIGS. 20a and 20b show a preferred configuration of the scanning system 5 that is a component of the optical scanning system according to the fourth embodiment of the present invention. Data sheets for the three illustrative example, Examples 14, 15 and 16, of this preferred configuration are given below.

The meaning of the symbols remains the same as before.

EXAMPLE 13

| i | $r_i$ | $r'_i$ | $d_i$ | $n_i$ |
|---|---|---|---|---|
| 1 | ∞ | ∞ | 11.80 | 1.51072 |
| 2 | −120.8 | −40.4 | | |
| | e = 74.00 | b = 228.86 | | |
| | l = 0.15f | f = 236.53 | m = 2.0 | |

EXAMPLE 14

| i | $r_i$ | $r'_i$ | $d_i$ | $n_i$ |
|---|---|---|---|---|
| 1 | ∞ | ∞ | 11.75 | 1.48479 |
| 2 | −114.7 | −37.8 | | |
| | e = 71.20 | b = 228.44 | | |
| | l = 0.15f | f = 236.60 | m = 2.0 | |

EXAMPLE 15

| i | $r_i$ | $r'_i$ | $d_i$ | $n_i$ |
|---|---|---|---|---|
| 1 | ∞ | −200 | 11.00 | 1.48479 |
| 2 | −120.0 | −29.2 | | |
| | e = 68.00 | b = 237.00 | | |
| | l = 0.08f | f = 247.53 | m = 2.5 | |

Figure 21:
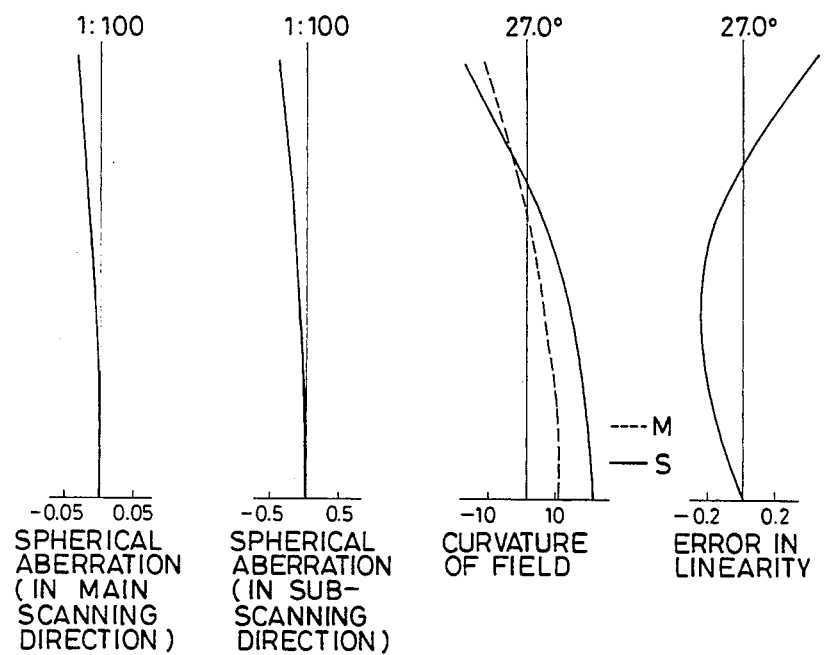
FIGS. 21 to 23 are graphs plotting the aberration curves obtained Examples 14 to 16, respectively, of the scanning lens system in accordance with the fourth embodiment.
Figure 22:
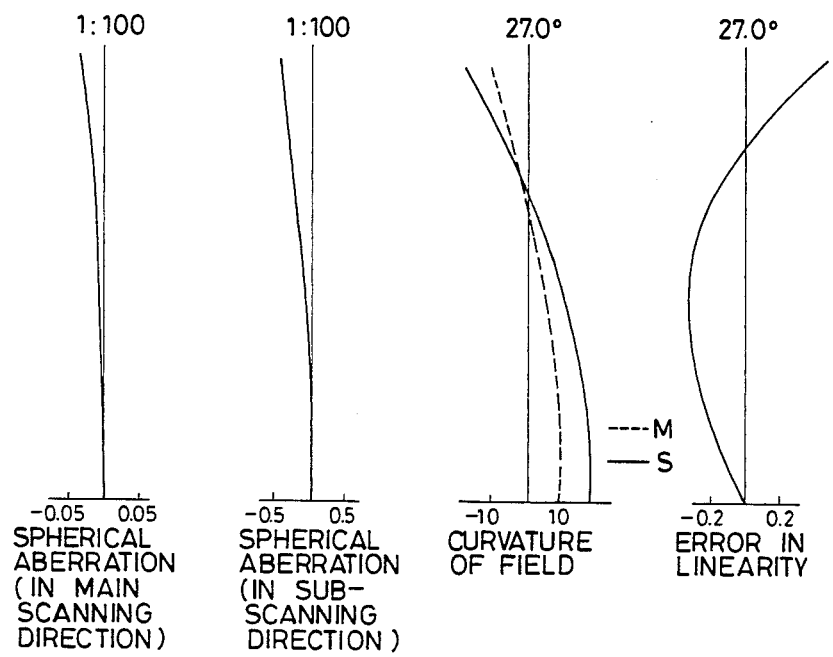
Figure 23:
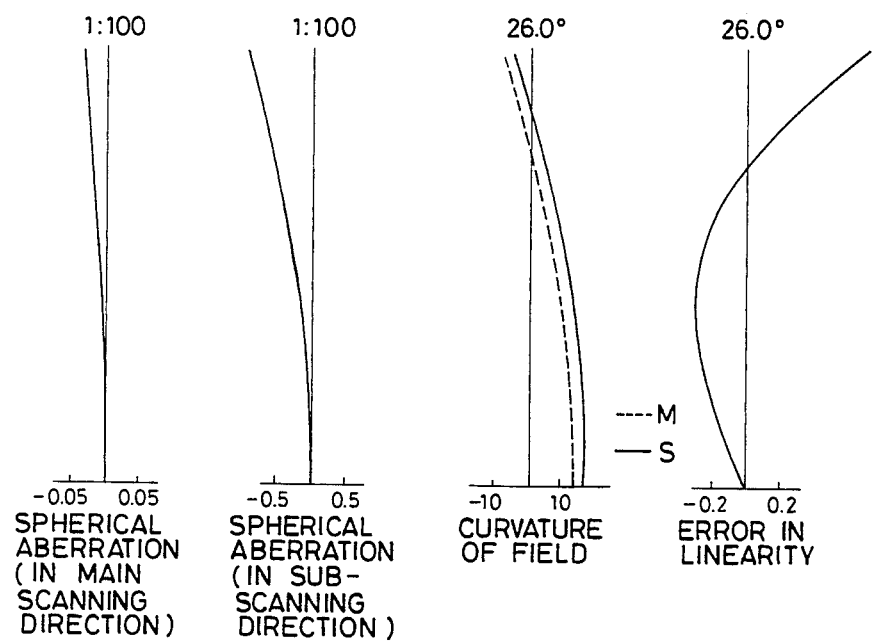

FIGS. 21 to 23 are graphs plotting the aberration curves obtained in Examples 14 to 16, respectively, with the same explanation for the curves.

As described in the foregoing pages, the scanning lens system 5 used in the present invention is anamorphic and has a laser beam focused once to form an image at a point ahead of the plane of deflection in the sub-scanning cross section and this renders the focal length of the system including the convex cylindrical lens 3 to be shorter in the sub-scanning direction than in the main scanning direction. As a result, by allowing the main scanning direction tp coincide with the perpendicular direction of the semiconductor laser 1 in which an emitted laser beam diverges at a large angle, substantial beam shaping can be achieved since the concentrated beam has the same F number both in the main scanning direction and in the sub-scanning direction.

As a further advantage, the focal length in the sub-scanning direction can be varied by changing the curvature and position of the convex cylindrical lens 3 with the first beam focusing point $F_1$ being held constant. This is effective in adjusting the degree of beam shaping to attain a desired shape of beam spot.

In addition, according to the present invention, the laser beam once focused to form an image ahead of the deflecting plane in the sub-scanning cross section is focused again by the anamorphic scanning lens system to form an image at a magnification m. Therefore, if the plane of deflection tilts by an amount δ, the offset in the image point, ΔS, can be approximated by 2lmδ, which is much smaller than the amount (ΔS') that occurs in the absence of compensation by the system of the present invention and which is approximated by to fδ, where f is the focal length in the main scanning direction. Also, the plane of deflection is offset from the focusing point $F_1$ and the laser light encountering the plane of deflection has a sufficiently large area to remain insensitive to surface flaws or dust buildup on that surfaced.

In accordance with the present invention, the influence of the variation of the deflecting point can be reduced by increasing the distance between the first focal point $F_1$ and the frontal principal point of the scanning lens system 5 in the sub-scanning cross section.

The smaller the magnification m of the image formed on the scanning plane 6 by focusing with the scanning lens system 5 relative to the image formed on the first focusing point $F_1$, the higher the efficiency of compensation for the tilting of deflection planes and the shorter the focal length of the overall system (including the convex cylindrical lens 3) in the sub-scanning direction, which is beneficial to the purpose of attaining efficient beam shaping.

I claim:

1. An optical system comprising:
   a semiconductor laser;
   a collimating lens that produces a beam of generally parallel rays from laser light emitted from said semiconductor laser;
   a cylindrical lens that has a curvature in a first cross section and which once performs a focusing of the laser light to form an image in said first cross section;
   a deflector that is disposed behind a point at which said image has been formed in the first cross section as a result of focusing by said cylindrical lens; and
   an anamorphic scanning lens system by which the deflected beam from said deflector is concentrated on a scanning plane, said anamorphic optical system satisfying the following condition:

$$0.03f < l < 0.25f \quad (1)$$

where l is the distance between a plane of deflection of said deflector and a point at which said image has been formed in said first cross section as a result of focusing with said cylindrical lens, and f is the focal length of the scanning lens system in a second cross section, substantially perpendicular to said first cross section.

2. An optical system comprising:
   a semiconductor laser;
   a collimating lens that produces a beam of generally parallel rays of beam from laser light emitted from said semiconductor laser;
   a cylindrical lens that has a curvature in a first cross section and which once performs a focusing of the laser light to form an image in said first cross section;
   a deflector that is disposed behind a point at which said image has been formed in the first cross section as a result of focusing by said cylindrical lens; and
   an anamorphic scanning lens system by which the deflected beam from said deflector is concentrated on a scanning plane, said anamorphic lens system being composed, in order from a side of said deflector, of a first, a second and a third lens group;
   a lens of said first lens group being a negative lens that has a concave cylindrical surface with a curvature being present in the first cross section;
   a lens of said second lens group being a convex meniscus lens that has a concave surface directed toward the side of said deflector; and
   a lens of said third group having a planar surface on the side of said deflector and a convex toric surface on the side of the scanning plane which has a stronger curvature in the first cross section than in a second cross section perpendicular thereto.

3. An optical system according to claim 2 which satisfies the following condition:

$$1.7 < m < 2.7$$

where m is the magnification of an image formed on the scanning plane by focusing with said lens system relative to said image formed in the first cross section by focusing with said cylindrical lens.

4. An optical system as recited in claim 3, wherein said anamorphic scanning lens system consists of three lenses, each lens having a surface facing said deflector of a radius of curvature $r_i$ in said second cross section and of a radius of curvature $r'_i$ in said first cross section and a surface facing away from said deflector of a radius of curvature $r_{i+1}$ in said second cross section and a radius of curvature $r'_{i+1}$ in said first cross section, a thickness $d_i$, an aerial separation to a lens further away from said deflector of $d_{i+1}$ and a refractive index of $n_i$, said anamorphic scanning lens system satisfying the following table:

| i | $r_i$ | $r'_i$ | $d_i$ | $n_i$ |
|---|---|---|---|---|
| 1 | −227.748 | −227.748 | 7.46 | 1.71230 |
| 2 | ∞ | 34.870 | 5.12 | |
| 3 | −168.731 | −168.731 | 10.00 | 1.60910 |
| 4 | −154.768 | −154.768 | 0.50 | |
| 5 | ∞ | ∞ | 16.80 | 1.71230 |
| 6 | −88.050 | −26.170 | | |

5. An optical system as recited in claim 3, wherein said anamorphic scanning lens system consists of three lenses, each lens having a surface facing said deflector of a radius of curvature $r_i$ in said second cross section and of a radius of curvature $r'_i$ in said first cross section and a surface facing away from said deflector of a radius of curvature $r_{i+1}$ in said second cross section and a radius of curvature $r'_{i+1}$ in said first cross section, a thickness $d_i$, an aerial separation to a lens further away from said deflector of $d_{i+1}$ and a refractive index of $n_i$, said anamorphic scanning lens system satisfying the following table:

| i | $r_i$ | $r'_i$ | $d_i$ | $n_i$ |
|---|---|---|---|---|
| 1 | −224.410 | −224.410 | 7.00 | 1.73814 |
| 2 | ∞ | 27.470 | 4.58 | |
| 3 | −164.214 | −164.214 | 10.00 | 1.60910 |
| 4 | −151.400 | −151.400 | 0.50 | |

-continued

| i | $r_i$ | $r'_i$ | $d_i$ | $n_i$ |
|---|---|---|---|---|
| 5 | ∞ | ∞ | 16.27 | 1.73814 |
| 6 | −89.509 | −24.180 | | |

6. An optical system as recited in claim 3, wherein said anamorphic scanning lens system consists of three lenses, each lens having a surface facing said deflector of a radius of curvature $r_i$ in said second cross section and of a radius of curvature $r'_i$ in said first cross section and a surface facing away from said deflector of a radius of curvature $r_{i+1}$ in said second cross section and a radius of curvature $r'_{i+1}$ in said first cross section, a thickness $d_i$, an aerial separation to a lens further away from said deflector of $d_{i+1}$ and a refractive index of $n_i$, said anamorphic scanning lens system satisfying the following table:

| i | $r_i$ | $r'_i$ | $d_i$ | $n_i$ |
|---|---|---|---|---|
| 1 | −225.620 | −225.620 | 7.95 | 1.71230 |
| 2 | ∞ | 32.200 | 4.83 | |
| 3 | −189.738 | −189.738 | 10.20 | 1.60910 |
| 4 | −166.077 | −166.077 | 0.40 | |
| 5 | ∞ | ∞ | 16.80 | 1.71230 |
| 6 | −88.700 | −25.10 | | |

7. An optical system as recited in claim 3, wherein said anamorphic scanning lens system consists of three lenses, each lens having a surface facing said deflector of a radius of curvature $r_i$ in said second cross section and of a radius of curvature $r'_i$ in said first cross section and a surface facing away from said deflector of a radius of curvature $r_{i+1}$ in said second cross section and a radius of curvature $r'_{i+1}$ in said first cross section, a thickness $d_i$, an aerial separation to a lens further away from said deflector of $d_{i+1}$ and a refractive index of $n_i$, said anamorphic scanning lens system satisfying the following table:

| i | $r_i$ | $r'_i$ | $d_i$ | $n_i$ |
|---|---|---|---|---|
| 1 | −176.700 | −176.700 | 11.19 | 1.71230 |
| 2 | ∞ | 53.2 | 3.60 | |
| 3 | −173.952 | −173.952 | 7.50 | 1.51072 |
| 4 | −128.547 | −128.547 | 0.50 | |
| 5 | ∞ | ∞ | 17.00 | 1.71230 |
| 6 | −76.90 | −25.5 | | |

8. An optical system as recited in claim 3, wherein said anamorphic scanning lens system consists of three lenses, each lens having a surface facing said deflector of a radius of curvature $r_i$ in said second cross section and of a radius of curvature $r'_i$ in said first cross section and a surface facing away from said deflector of a radius of curvature $r_{i+1}$ in said second cross section and a radius of curvature $r'_{i+1}$ in said first cross section, a thickness $d_i$, an aerial separation to a lens further away from said deflector of $d_{i+1}$ and a refractive index of $n_i$, said anamorphic scanning lens system satisfying the following table:

| i | $r_i$ | $r'_i$ | $d_i$ | $n_i$ |
|---|---|---|---|---|
| 1 | −159.750 | −159.750 | 12.00 | 1.71230 |
| 2 | ∞ | 61.6 | 6.30 | |
| 3 | −850.409 | −850.409 | 12.30 | 1.51072 |
| 4 | −172.480 | −172.480 | 2.70 | |
| 5 | ∞ | ∞ | 17.40 | 1.71230 |
| 6 | −144.50 | −40.5 | | |

9. An optical system as recited in claim 3, wherein said anamorphic scanning lens system consists of three lenses, each lens having a surface facing said deflector of a radius of curvature $r_i$ in said second cross section and of a radius of curvature $r'_i$ in said first cross section and a surface facing away from said deflector of a radius of curvature $r_{i+1}$ in said second cross section and a radius of curvature $r'_{i+1}$ in said first cross section, a thickness $d_i$, an aerial separation to a lens further away from said deflector of $d_{i+1}$ and a refractive index of $n_i$, said anamorphic scanning lens system satisfying the following table:

| i | $r_i$ | $r'_i$ | $d_i$ | $n_i$ |
|---|---|---|---|---|
| 1 | −193.485 | −193.485 | 11.40 | 1.71230 |
| 2 | ∞ | 51.3 | 4.37 | |
| 3 | −220.000 | −220.000 | 7.95 | 1.51072 |
| 4 | −166.058 | −166.058 | 0.50 | |
| 5 | ∞ | ∞ | 17.00 | 1.71230 |
| 6 | −86.50 | −26.95 | | |

10. An optical system comprising:
a semiconductor laser;
a collimating lens that produces a beam of generally parallel rays from laser light emitted from said semiconductor laser;
a cylindrical lens that has a curvature in a first cross section and which once performs a focusing of the laser light to form an image in said first cross section;
a deflector that is disposed behind a point at which said image has been formed in the first cross section as a result of focusing by said cylindrical lens; and
an anamorphic scanning lens system by which the deflected beam from said deflector is concentrated on a scanning plane, said scanning lens system being composed, in order from a side of said deflector, of a first and a second lens group;
a lens in said first lens group being a negative lens that has a concave cylindrical surface with a curvature being present in said first cross section; and
a lens in said second lens group having a planar surface on a side of said deflector and a convex toric surface on a side of the scanning plane which has a stronger curvature in the first cross section than in a second cross section perpendicular thereto.

11. A optical system according to claim 10 which satisfies the following condition:

$$1.1 < m < 1.7$$

where m is the magnification of the image formed on the scanning plane by focusing with said lens system relative to said image formed in said first cross section by focusing with said cylindrical lens.

12. An optical system according to claim 10 which satisfies the following condition:

$$0.15f < |f_1'| < 0.35f$$

where $f_1'$ is the focal length of said lens in said first lens group in the first cross section, and f is a focal length of the anamorphic scanning lens system in said second cross section.

13. An optical system as recited in claim 12, wherein said anamorphic scanning lens system consists of two lenses, each lens having a surface facing said deflector of a radius of curvature $r_i$ in said second cross section and of a radius of curvature $r'_i$ in said first cross section and a surface facing away from said deflector of a radius of curvature $r_{i+1}$ in said second cross section and a radius of curvature $r'_{i+1}$ in said first cross section, a thickness $d_i$, an aerial separation to a lens further away from said deflector of $d_{i+1}$ and a refractive index of $n_i$, said anamorphic scanning lens system satisfying the following table:

| i | $r_i$ | $r'_i$ | $d_i$ | $n_i$ |
|---|-------|--------|-------|-------|
| 1 | ∞ | −22.4 | 10.95 | 1.60910 |
| 2 | 392.892 | 392.892 | 8.59 | |
| 3 | ∞ | ∞ | 19.50 | 1.76591 |
| 4 | −82.70 | −25.5 | | |

14. An optical system as recited in claim 12, wherein said anamorphic scanning lens system consists of two lenses, each lens having a surface facing said deflector of a radius of curvature $r_i$ in said second cross section and of a radius of curvature $r'_i$ in said first cross section and a surface facing away from said deflector of a radius of curvature $r_{i+1}$ in said second cross section and a radius of curvature $r'_{i+1}$ in said first cross section, a thickness $d_i$, an aerial separation to a lens further away from said deflector of $d_{i+1}$ and a refractive index of $n_i$, said anamorphic scanning lens system satisfying the following table:

| i | $r_i$ | $r'_i$ | $d_i$ | $n_i$ |
|---|-------|--------|-------|-------|
| 1 | ∞ | −32.5 | 8.90 | 1.71230 |
| 2 | 423.000 | 423.000 | 7.94 | |
| 3 | ∞ | ∞ | 21.96 | 1.76591 |
| 4 | −82.000 | −26.2 | | |

15. An optical system as recited in claim 12, wherein said anamorphic scanning lens system consists of two lenses, each lens having a surface facing said deflector of a radius of curvature $r_i$ in said second cross section and of a radius of curvature $r'_i$ in said first cross section and a surface facing away from said deflector of a radius of curvature $r_{i+1}$ in said second cross section and a radius of curvature $r'_{i+1}$ in said first cross section, a thickness $d_i$, an aerial separation to a lens further away from said deflector of $d_{i+1}$ and a refractive index of $n_i$, said anamorphic scanning lens system satisfying the following table:

| i | $r_i$ | $r'_i$ | $d_i$ | $n_i$ |
|---|-------|--------|-------|-------|
| 1 | ∞ | −22.3 | 9.89 | 1.71230 |
| 2 | 425.000 | 425.000 | 10.23 | |
| 3 | ∞ | ∞ | 22.60 | 1.76591 |
| 4 | −87.75 | −26.5 | | |

16. An optical system comprising:
a semiconductor laser;
a collimating lens that produces a beam of generally parallel rays from laser light emitted from said semiconductor laser;
a cylindrical lens that has a curvature in a first cross section and which once performs a focusing of the laser light to form an image in said first cross section;
a deflector that is disposed behind a point at which said image has been formed in the first cross section as a result of focusing by said cylindrical lens; and
an anamorphic scanning lens system by which a deflected beam from said deflector is concentrated on a scanning plane, said anamorphic scanning lens system being composed, in order from a side of said deflector side, of four lens groups;
a first-group lens being a negative lens that has a concave cylindrical surface with a curvature being present in the first cross section;
a second-group lens being a convex meniscus lens that has its concave surface directed toward the deflector side;
a third-group lens having a planar surface on the deflector side and a convex toric surface on the side of the scanning plane which has a stronger curvature in the first cross section than in a second cross section perpendicular thereto; and
a fourth-group lens having convex cylindrical surface which has a curvature in the first cross section.

17. An optical system according to claim 16 which satisfies the following condition:

$$0.8 < m < 2.0$$

where m is a magnification of the image formed on the scanning plane by focusing with said anamorphic scanning lens system relative to said image formed in the first cross section by focusing with said cylindrical lens.

18. An optical system as recited in claim 17, wherein said anamorphic scanning lens system consists of four lenses, each lens having a surface facing said deflector of a radius of curvature $r_i$ in said second cross section and of a radius of curvature $r'_i$ in said first cross section and a surface facing away from said deflector of a radius of curvature $r_{i+1}$ in said second cross section and a radius of curvature $r'_{i+1}$ in said first cross section, a thickness $d_i$, an aerial separation to a lens further away from said deflector of $d_{i+1}$ and a refractive index of $n_i$, said anamorphic scanning lens system satisfying the following table:

| i | $r_i$ | $r'_i$ | $d_i$ | $n_i$ |
|---|-------|--------|-------|-------|
| 1 | −177.221 | −177.221 | 12.96 | 1.71230 |
| 2 | ∞ | 60.68 | 9.09 | |
| 3 | −714.254 | −714.254 | 14.79 | 1.51072 |
| 4 | −201.889 | −201.889 | 2.01 | |
| 5 | ∞ | ∞ | 15.94 | 1.71230 |
| 6 | −152.654 | −52.88 | 51.85 | |
| 7 | ∞ | ∞ | 15.00 | 1.51072 |
| 8 | ∞ | −154.56 | | |

19. An optical system as recited in claim 17, wherein said anamorphic scanning lens system consists of four lenses, each lens having a surface facing said deflector of a radius of curvature $r_i$ in said second cross section and of a radius of curvature $r'_i$ in said first cross section and a surface facing away from said deflector of a radius of curvature $r_{i+1}$ in said second cross section and a radius of curvature $r'_{i+1}$ in said first cross section, a thickness $d_i$, an aerial separation to a lens further away from said deflector of $d_{i+1}$ and a refractive index of $n_i$, said anamorphic scanning lens system satisfying the following table:

| i | $r_i$ | $r'_i$ | $d_i$ | $n_i$ |
|---|---|---|---|---|
| 1 | −218.512 | −218.512 | 17.65 | 1.63552 |
| 2 | ∞ | 20.6 | 5.46 | |
| 3 | −267.583 | −267.583 | 9.60 | 1.51072 |
| 4 | −199.640 | −199.640 | 0.60 | |
| 5 | ∞ | ∞ | 19.11 | 1.68443 |
| 6 | −102.54 | −37.60 | 48.59 | |
| 7 | ∞ | ∞ | 9.60 | 1.51072 |
| 8 | ∞ | −55.53 | | |

20. An optical system as recited in claim 17, wherein said anamorphic scanning lens system consists of four lenses, each lens having a surface facing said deflector of a radius of curvature $r_i$ in said second cross section and of a radius of curvature $r_i$ in said first cross section and a surface facing away from said deflector of a radius of curvature $r_{i+1}$ in said second cross section and a radius of curvature $r'_{i+1}$ in said first cross section, a thickness $d_i$, an aerial separation to a lens further away from said deflector of $d_{i+1}$ and a refractive index of $n_i$, said anamorphic scanning lens system satisfying the following table:

| i | $r_i$ | $r'_i$ | $d_i$ | $n_i$ |
|---|---|---|---|---|
| 1 | −194.926 | −194.926 | 12.12 | 1.71230 |
| 2 | ∞ | 38.96 | 8.71 | |
| 3 | −654.385 | −654.385 | 12.36 | 1.51072 |
| 4 | −211.817 | −211.817 | 1.91 | |
| 5 | ∞ | ∞ | 17.71 | 1.71230 |
| 6 | −142.685 | −46.87 | 54.90 | |
| 7 | ∞ | 114.53 | 13.40 | 1.51072 |
| 8 | ∞ | ∞ | | |

21. An optical system comprising:
a semiconductor laser;
a collimating lens that produces a beam of generally parallel rays from laser light emitted from said semiconductor laser;
a cylindrical lens that has a curvature in a first cross section and which once performs a focusing of the laser light to form an image in said first cross section;
a deflector that is disposed behind a point at which an image has been formed in the first cross section as a result of focusing by said cylindrical lens; and
an anamorphic scanning lens system by which the deflected beam from said deflector is concentrated on a scanning plane, said anamorphic scanning lens system consisting of a single lens group that has a convex toric surface on the side of the scanning plane which has a stronger curvature in the first cross section than in a second cross section perpendicular thereto.

22. An optical system according to claim 21 which satisfies the following condition:

$$1.7 < m < 2.7$$

where m is the magnification of the image formed on the scanning plane by focusing with said anamorphic scanning lens system relative to the image formed in the first cross section by focusing with said cylindrical lens.

23. An optical system as recited in claim 22, wherein said anamorphic scanning lens system consists of one lens, said lens having a surface facing said deflector of a radius of curvature $r_i$ in said second cross section and of a radius of curvature $r'_i$ in said first cross section and a surface facing away from said deflector of a radius of curvature $r_{i+1}$ in said second cross section and a radius of curvature $r'_{i+1}$ in said first cross section, a thickness $d_i$ and a refractive index of $n_i$, said anamorphic scanning lens system satisfying the following table:

| i | $r_i$ | $r'_i$ | $d_i$ | $n_i$ |
|---|---|---|---|---|
| 1 | ∞ | ∞ | 11.80 | 1.51072 |
| 2 | −120.8 | −40.4 | | |

24. An optical system as recited in claim 22, wherein said anamorphic scanning lens system consists of one lens, said lens having a surface facing said deflector of a radius of curvature $r_i$ in said second cross section and of a radius of curvature $r_i$ in said first cross section and a surface facing away from said deflector of a radius of curvature $r_{i+1}$ in said second cross section and a radius of curvature $r'_{i+1}$ in said first cross section, a thickness $d_i$ and a refractive index of $n_i$, said anamorphic scanning lens system satisfying the following table:

| i | $r_i$ | $r'_i$ | $d_i$ | $n_i$ |
|---|---|---|---|---|
| 1 | ∞ | ∞ | 11.75 | 1.48479 |
| 2 | −114.7 | −37.8 | | |

25. An optical system as recited in claim 22, wherein said anamorphic scanning lens system consists of one lens, said lens having a surface facing said deflector of a radius of curvature $r_i$ in said second cross section and of a radius of curvature $r_i$ in said first cross section and a surface facing away from said deflector of a radius of curvature $r_{i+1}$ in said second cross section and a radius of curvature $r'_{i+1}$ in said first cross section, a thickness $d_i$ and a refractive index of $n_i$, said anamorphic scanning lens system satisfying the following table:

| i | $r_i$ | $r'_i$ | $d_i$ | $n_i$ |
|---|---|---|---|---|
| 1 | ∞ | −200 | 11.00 | 1.48479 |
| 2 | −120.0 | −29.2 | | |

* * * * *